United States Patent [19]
Morley

[11] Patent Number: 5,349,179
[45] Date of Patent: Sep. 20, 1994

[54] NIGHT VISION DEVICE WITH HOLOGRAPHIC RETICLE WHICH IS TRANSPARENT IN A FIRST CONDITION AND VISIBLY SUPERIMPOSED IN A SECOND CONDITION

[75] Inventor: Roland M. Morley, Tempe, Ariz.

[73] Assignee: Litton Systems, Inc., Woodland Hills, Calif.

[21] Appl. No.: 86,522

[22] Filed: Jul. 1, 1993

[51] Int. Cl.⁵ .................. G02B 23/10; G02B 27/34
[52] U.S. Cl. ..................... 250/214 VT; 356/252
[58] Field of Search ............ 250/214 VT, 330; 356/247, 252; 313/524, 534

[56] References Cited

U.S. PATENT DOCUMENTS

| | | | |
|---|---|---|---|
| 3,951,553 | 4/1976 | Oberhauser | 356/251 |
| 3,994,597 | 11/1976 | Calder et al. | 356/252 |
| 4,417,814 | 11/1983 | Doliber . | |
| 4,792,673 | 12/1988 | Blackler . | |
| 4,884,137 | 11/1989 | Hanson et al. | 358/108 |
| 5,005,213 | 4/1991 | Hanson et al. | 224/181 |

Primary Examiner—David C. Nelms
Assistant Examiner—Stephone B. Allen
Attorney, Agent, or Firm—Poms, Smith, Lande & Rose

[57] ABSTRACT

A night vision device with a holographic reticle ordinarily provides a user with all image of a night time scene unimpaired by any reticle pattern. Such a reticle pattern can interfere with night time observations, or may be distracting to the user. Consequently, the utility of the night vision device for use by observers is improved. However, when the holographic reticle is activated, the user is provided with a clearly visible reticle pattern superimposed on the night time scene. The reticle pattern may be used, for example, to estimate ranges to objects observed, or to aim a weapon.

24 Claims, 2 Drawing Sheets

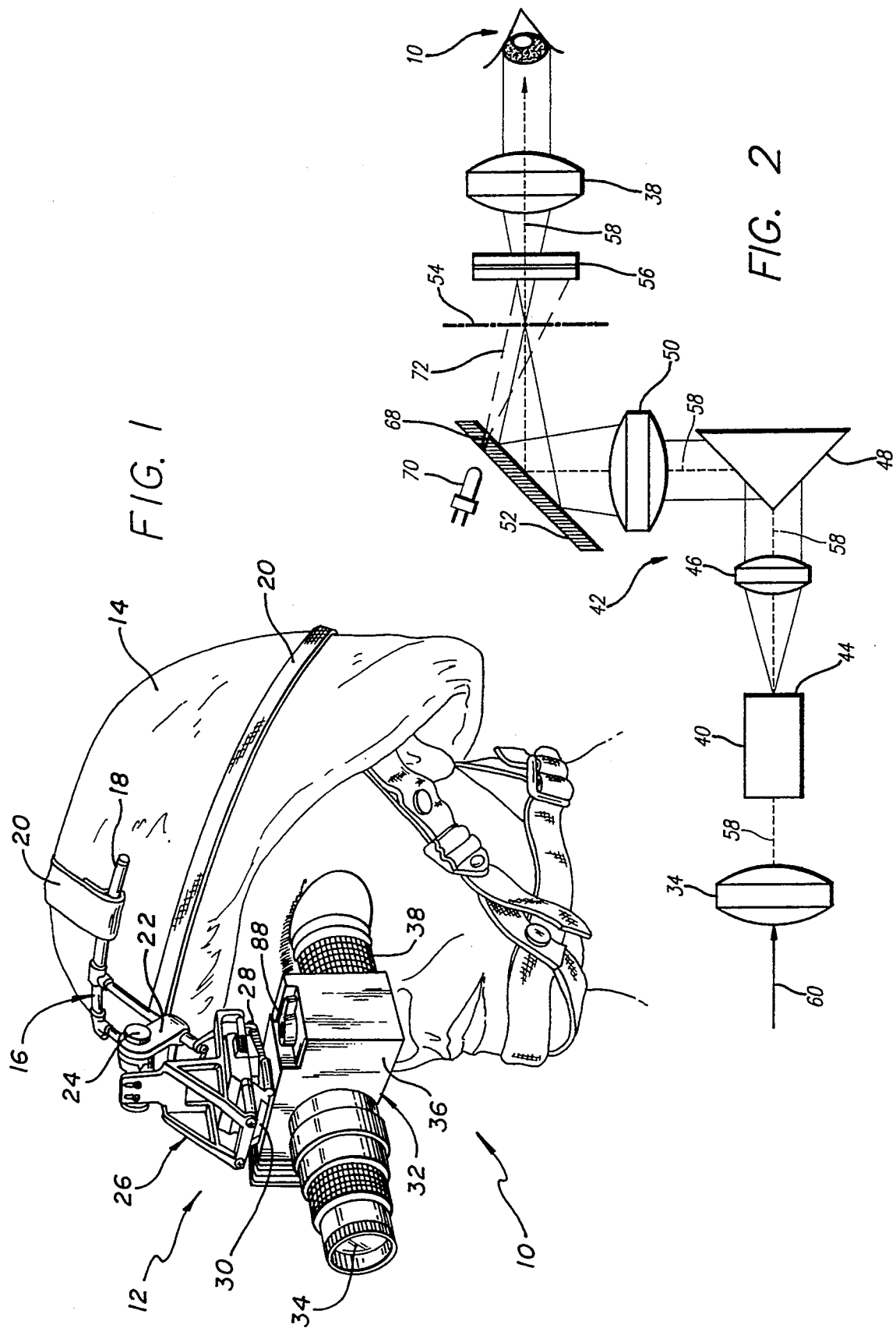

NIGHT VISION DEVICE WITH HOLOGRAPHIC RETICLE WHICH IS TRANSPARENT IN A FIRST CONDITION AND VISIBLY SUPERIMPOSED IN A SECOND CONDITION

BACKGROUND OF THE INVENTION

1. Field of the Invention

The present invention relates to night vision devices. More particularly, the present invention relates to night vision devices of the type which include an image intensifier assembly providing an enhanced image representative of a night scene which is illuminated only at a low level, such as by star light. Still more particularly, the present invention relates to such a night vision device also including a reticle which the user of the device may use, for example, to estimate ranges to objects observed through the device, or to aim a weapon.

2. Related Technology

A conventional night vision device is known in accord with U.S. Pat. No. 4,792,6673, issued Dec. 20, 1988, to F. G. Blackler. The teaching of the Blackler patent is believed to be to provide a night vision device with a graticule (reticle) disposed immediately adjacent to the phosphor image output screen of the image intensifier tube. A transparent plate is disposed at the phosphor screen of the image intensifier tube, and includes an etched light-diffusing graticle pattern. The light-diffusing graticle plate of the Blackler patent is illuminated at its edges with a color of light contrasting with the phosphor yellow-green image provided by the image intensifier tube. Consequently, this device provides a contrasting color of graticle pattern which is visible through the eye piece of the night vision device.

Another conventional night vision device with an aiming reticle is known according to U.S. Pat. No. 4,417,814, issued Nov. 9, 1983, to Darrel Doliber. The teaching of the Doliber patent is believed to be to provide a night vision device with an image combining mirror at the rear of the image intensifier tube. A light source projects a reticle onto the image combining mirror, which reticle is then viewed via an eye piece superimposed on the intensified image of the intensifier tube.

Conventional night vision devices are also known which inject a reticle pattern into the input surface of the image intensifier tube at a very low illumination level. The reticle image is then fused with the enhanced image resulting from low level light from a night time scene which also falling on this intensifier tube input surface. Thus, the user of such a device sees the reticle pattern also intensified by the intensifier tube and superimposed on the image of the night time scene.

SUMMARY OF THE INVENTION

In view of the above, a primary object for the present invention is to provide a viewing device including an objective lens through which light from a scene is received, an eye piece through which an image of the scene is provided to a user of the device, and an optical pathway extending between the objective lens and the eye piece, a holographic reticle disposed in the optical pathway and being substantially completely transparent in a first condition, in a second condition the holographic reticle providing a holographic reticle pattern visible in the eye piece superimposed on the scene image.

More particularly, an object for the present invention is to provide such a viewing device in which the optical pathway also includes a focal plane the holographic reticle being located at or spaced from the focal plane and in the second condition providing a holographic reticle pattern at the focal plane for viewing through the eye piece.

Yet another object of the present invention is to provide such a viewing device which includes an image intensifier tube adapting the device particularly for viewing night scenes of low-level illumination.

Still another object for the present invention is to provide such a night vision device which has particular utility for observational uses because the holographic reticle is invisible in its first condition and provides an unobstructed view through the device. The device having additional utility in the second condition of the holographic reticle for range estimation or weapon aiming purposes, for example.

Additional objects and advantages of the present invention will be apparent from reading the following description of particularly preferred exemplary embodiments of the present invention, taken in conjunction with the following drawing Figures, in which:

DESCRIPTION OF THE DRAWING FIGURES

FIG. 1 provides a fragmentary perspective view of a user wearing a helmet carrying a support structure which supports a night vision viewer in front of the user's eyes;

FIG. 2 is a schematic representation of a portion of the optical system of the night vision viewer seen in FIG. 1;

FIGS. 3A and 3 B provide respective side elevation and frontal views of a component part of the night vision device, and particularly, of the optical system seen in FIG. 2.

DESCRIPTION OF THE PREFERRED EMBODIMENTS

Figure 3A:
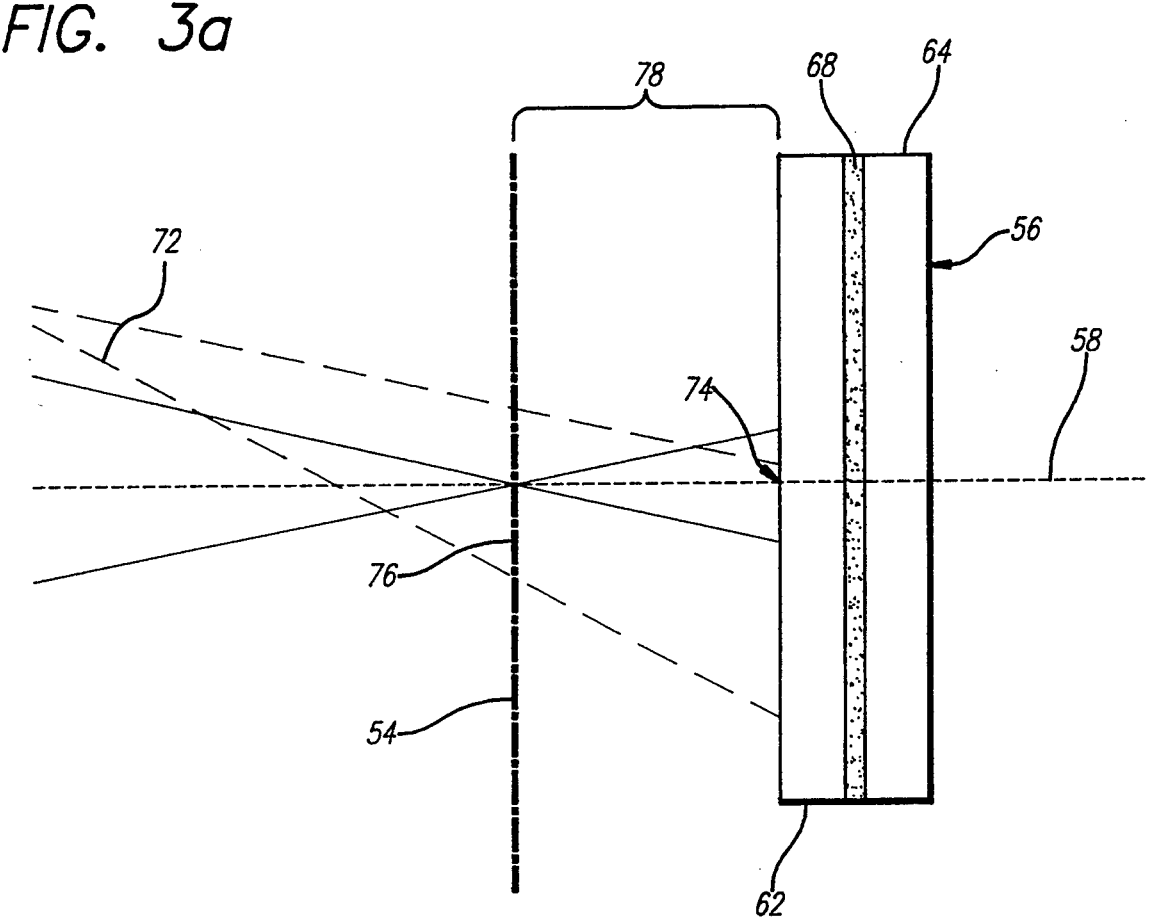

Referring first to FIG. 1, an operator 10 is shown using a night vision device 12. The operator 10 wears a helmet 14 carrying a support structure portion 16 of the night vision device 12. This support structure 16 includes a frame 18 secured to the helmet 14 with various straps 20 and having a forwardly and upwardly extending clevis 22. The clevis 22 carries a hinge pin 24 (best seen in FIG. 2) for a flip up mount portion 26 of the support structure 16. Consequently, the flip up mount portion 26 of the support structure 16 is hinged on the clevis 22 for pivotal movement about hinge pin 24. The flip up mount portion 26 carries a carriage 28 and a coupling device 30. A night vision viewer 32 is suspended from the support structure 16 at the coupling device 30. This night vision viewer 32 is of goggle configuration and includes a single objective lens 34, a housing 36, and a pair of eye pieces 38 aligned with respective eyes of the operator 10.

To use the night vision viewer 32, the operator 10 places it in the use position depicted in FIGS. 1, and 3, and looks into eye pieces 38 to see an enhanced image representative of the low-level light from a night time scene which has entered objective lens 34. As those ordinarily skilled in the pertinent arts will appreciate, the night vision viewer 32 includes a power supply in the form of a battery normally enclosed with the night vision viewer housing. Internally of the night vision viewer, a power supply circuit provides power to an image intensifier tube (schematically depicted in FIG. 2, and referenced with numeral 40), which is well known in the pertinent arts, and which supplies to the eye pieces 38 an intensified image in phosphor green light of the night time scene viewed via the objective lens 34.

FIG. 2 schematically depicts an optical system 42 of the night vision viewer 32. As mentioned, the optical system 42 includes an objective lens 34, an image intensifier tube 40 which at a rear surface 44 thereof provides an enhanced image of the night scene viewed through the objective lens 34, and a pair of eye pieces 38, only one of which is depicted in the schematic illustration of FIG. 2. More particularly, the optical system 42 also includes a collimator lens 46, and a prismatic image splitter 48, which in combination provide a complete enhanced image at each of the eye pieces 38. Because the remainder of the optical system 42, with one exception to be explained, is duplicated for each of the user's eyes, only the right-hand side is depicted in FIG. 2. The optical system 42 includes an intermediate lens assembly 50, and a mirror 52, which in combination form a focal plane referenced with the numeral 54. Spaced from the focal plane 54 is a holographic reticle assembly 56, which transmits the enhanced image to the eye piece lenses 38. These eye piece lenses are schematically depicted on FIG. 2 with a singular lens. However, as will be seen, the eye pieces 38 are preferably of a multi-lens type. The holographic reticle assembly 56 is not duplicated on the left-hand side of the night vision viewer 32. It may be optically balanced, however, by use of a dummy plate of equal optical thickness and light transmission for purposes of matching image quality for the left and right eyes of the user.

Cooperatively, the components of optical system 42 define an optical pathway, referenced with the numeral 58, and extending from the objective lens 34 through the eyepieces 38. Light from a scene which falls on the objective lens 34, as is depicted by arrow 60 viewing FIG. 2, is conducted along the optical pathway 58 to the image intensifier tube 40. This tube 40 provides at the surface 44 an enhanced image which is representative of the scene viewed through the objective lens 34. Consequently, the image intensifier tube 40 may be considered as a part of the optical pathway 58 which provides a higher-intensity analogue of the light 60. The optical pathway 58 continues along the collimator lens 46, splitter 48, intermediate lens 50, and mirror 52, to form the focal plane at 54. The eye pieces 38 provide to the user 10 a view of the image at focal plane 54. Consequently, the optical pathway 58 also extends through the eye pieces 38 and to the operator 10.

Figure 3B:
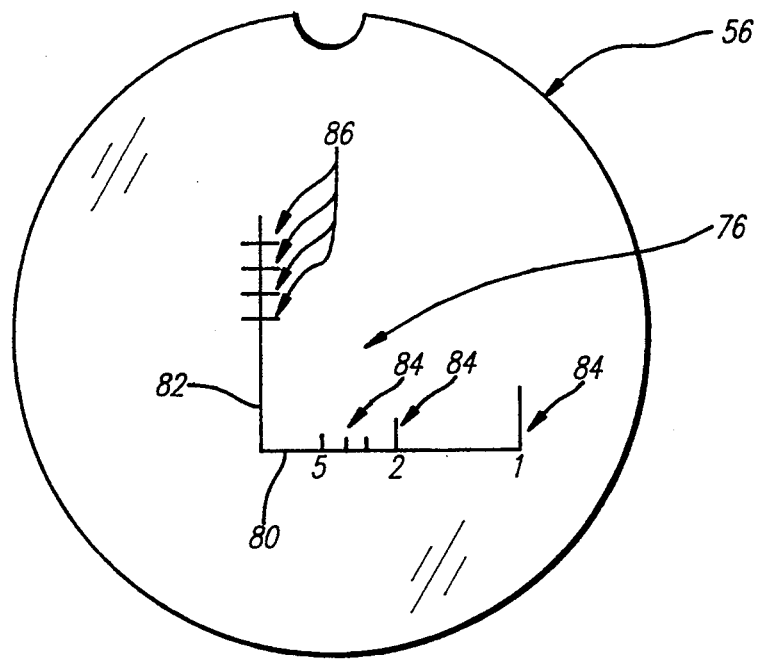

Viewing now FIGS. 3A and 3B, the holographic reticle assembly 56 is depicted in isolation view. This holographic reticle assembly 56 includes a first 62, and second 64, circular and planar glass plates. The plates 62, 64 are preferably about 21 mm in diameter. Also preferably, the plates 62, 64, are of borosilicate 7059F, or equivalent, glass. These glass plates 62, 64 sandwich between then a thin layer of holographic material 66. Again preferably, the holographic material 66 is a dichromated gelatin. Alternatively, other holographic mediums which are well known in the pertinent arts, such as silver halide and other photosensitive materials, can be used to define the layer 66, either with or without the glass plates, 62, and 64, dependent on the nature of the holographic medium. That is, if a medium is selected which is itself sufficiently strong and self-supporting, the glass plates 62, 64 may not be necessary.

Importantly, the reticle assembly 56 every where has a light transmissibility of about 95 percent, or higher. Consequently, a user of the night vision device 32 who looks through the eye pieces 38 will not perceive the presence of reticle assembly 56. That is, the user 10 and will not perceive the presence of the holographic reticle assembly 56 except as explained below. Particularly, the user of the night vision device 32 will not see a reticle pattern in either eye piece 38.

Viewing FIG. 2 once again, it is seen that the mirror 52 defines an optical aperture 68. That is, the mirror 52 need not define a physical hole, but may merely have a hole in the reflective coating of the mirror. Preferably, this optical aperture 68 is outside of the portion of mirror 52 which is employed to reflect the image from splitter 48 toward eye piece 38. Thus, this portion of the mirror 52, and aperture 68 is not visible through the eye piece 38. Aligned with the optical aperture 68, is a light emitting diode (LED) 70. This LED 70 is preferably selected to provide a light with a peak wave length of 645 NM, and a spectral line width of 20 NM. Consequently, the optical aperture 68 acts like a pin-hole lens, and provides a cone of light 72 (best seen viewing FIG. 3A) from the LED 70, as though from a point source. This cone of LED light illuminates a central area 74 of the holographic reticle assembly 56. Preferably, the area 74 is a circle of substantially 9 mm diameter located at the center of the holographic reticle assembly 56.

When so illuminated, the holographic reticle assembly 56 can be seen to form a holographic reticle pattern 76 (viewing FIGS. 3A and 3B), which is apparently located at or spaced a distance 78 (viewing FIG. 3A) behind (that is, away from the user 10) the reticle assembly 56. In other words, the reticle pattern 76 appears to be at the intersection of an optical pathway 58 and the focal plane 54, viewing FIG. 3A. For this reason, the dashed line 54 of FIG. 3A is also referenced with the numeral 76 to make clear the coincidence of the focal plane 54 and holographic reticle pattern 76.

According to the preferred exemplary embodiment of the invention, the distance 78 by which the holographic reticle pattern 76 is spaced from the holographic reticle assembly 56 is substantially 2 mm. This holographic reticle pattern 76 includes a horizontal abscissa line 80 and a vertical ordinate line 82. In FIG. 3B, the size of the reticle pattern 76 is greatly enlarged to better illustrate details of the exemplary pattern. In fact, however, the actual size of the pattern 76 fills only 5 degrees of the field of view provided through the reticle assembly 56. Along the horizontal line 80 are spaced plural horizontally spaced-apart vertical lines 84 of successively longer lengths from left to right. The vertical lines 84 are of lengths corresponding to the apparent height of an average human (1.5 meters) when viewed at ranges indicated below the line 80 in hundreds of meters. On the other hand, the horizontal spacing of the lines 84 from the intersection of the lines 80 and 82 corresponds to the apparent length of a 7 meter long vehicle when viewed at the indicated ranges. Also, provided along the vertical line 82, are plural stadia marks 86 which may be useful in judging the height or range of various objects viewed in the image provided by the night vision device 32. These lines of demarcation, or stadia marks, may be important in judging sizes and distances because, as those ordinarily skilled in the pertinent arts are aware, many common visual clues to distance and size of observed objects are missing from the image provided by night vision devices. It will be understood that, alternatively, the reticle pattern 76 may take the form of the familiar cross hairs, or the popular inverted V-shape reticle commonly used to aim a weapon. Consequently, the night vision device 32 has utility not only for observation without the reticle pattern 76, but also for ranging with a reticle pattern, and for weapon aiming with an aiming reticle, if desired.

Those ordinarily skilled in the pertinent arts will recognize further that the present invention requires use of an optical system having an intermediate focal plane, such as the focal plane 54. That is, the virtual holographic image 76 provided by the holographic reticle assembly 56 appears erect (not inverted) at a location in the optical system 42 at which a real image from the image intensifier tube 40 is also presented. The objective lens 34 provides an inverted image to the intensifier tube 40. This inverted image is intensified and presented at the surface 44. The collimating lens 46 intermediate lens 50 act together to produce an erect (not inverted) image at focal plane 54. Thus, the eye piece optics 38 are used to magnify the image at focal plane 54, provide to the user 10 an upright image for viewing and project this image to the user 10.

Understandably, the night vision device 12 includes a control switch 88 (seen in FIG. 1), which in addition to controlling other functions of the night vision viewing device 32, allows the operator 10 to turn on and off the LED 70. As explained, when the LED 70 is off the reticle assembly 56 is substantially invisible to the user 10, so that each eye piece appears to provide an image of equal intensity. On the other hand, when the switch 88 is employed to turn on the LED 70, the user 10 sees the reticle pattern 76 superimposed on the image viewed with the right-hand eye. The user's eyes and brain will combine the viewed images so that the user 10 perceives a complete image superimposed with the reticle pattern 76.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. For example, a ranging holographic reticle may be provided in one branch of the optical system, while an aiming holographic reticle is provided in the other branch. That is, the operator of the night vision device may use the device for observation with no reticle pattern visible. When a range to an observed object is to be estimated, the operator would turn on a ranging holographic reticle which is viewed with the right eye, for example. After the range to the object is known, the operator would turn off the ranging reticle and turn on an aiming reticle which is viewed with the left eye. The control switch 88 can easily be arranged to provide separate illumination of such holographic reticles in the device 32. Consequently, the same night vision device could be used for observation, for range estimation, and for weapon aiming. In each of the latter two cases, the operator's eyes and brain will combine the images so that the operator perceives the image superimposed with the ranging or aiming reticle. Accordingly, the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

I claim:

1. A viewing device comprising:
   an objective lens through which light from a scene is received;
   an eye piece through which an image of the scene is provided to a user of the device;
   and an optical pathway extending between said objective lens and said eye piece;
   a holographic reticle disposed in said optical pathway and being substantially completely transparent in a first condition, in a second condition said holographic reticle providing a holographic reticle pattern visible in said eye piece and superimposed on the scene image.

2. The viewing device of claim 1 wherein said optical pathway also includes a focal plane, said holographic reticle being spaced from said focal plane and in the second condition providing said holographic reticle pattern at said focal plane for viewing through the eye piece.

3. The viewing device of claim 2 wherein said device further includes an image intensifier tube adapting the device particularly for viewing night scenes of low-level illumination.

4. The viewing device of claim 1 where in said holographic reticle is substantially invisible in its first condition and provides an unobstructed view through the eye piece, in the second condition of said holographic reticle said holographic reticle pattern being visible in said eye piece.

5. The viewing device of claim 1 wherein said reticle pattern includes features for estimating a range to objects observed with said device.

6. The viewing device of claim 5 wherein said reticle pattern includes features for aiming a weapon.

7. The viewing device of claim 1 wherein said holographic reticle includes a photosensitive holographic medium.

8. The viewing device of claim 7 wherein said holographic medium is selected from the materials including dichromated gelatin, and silver halide.

9. The viewing device of claim 8 wherein said holographic reticle includes a glass plate.

10. The viewing device of claim 9 wherein said holographic reticle includes a pair of glass plates sandwiching said photosensitive holographic medium therebetween.

11. The viewing device of claim 1 wherein said holographic reticle provides a holographic reticle pattern in said second condition when illuminated by exciting light.

12. The viewing device of claim 11 wherein said exciting light for said holographic reticle is provided by a light emitting diode.

13. The viewing device of claim 12 wherein said light emitting diode is selected to provide light substantially of substantially 645 NM wavelength, and with a spectral line width of substantially 20 NM.

14. The viewing device of claim 11 wherein said optical pathway includes a mirror, said mirror defining an optical aperture, and said exciting light for said holographic reticle shining thereon via said optical aperture.

15. The viewing device of claim 1 wherein said optical pathway includes an focal plane at which an image visible through said eye piece is formed, said holographic reticle being spaced from said focal plane and providing at said focal plane said holographic reticle pattern in said second condition of said holographic reticle.

16. A method of providing a night vision device in a first condition providing a view of a night scene which is unobstructed by any reticle pattern and in a second condition providing a view with a reticle pattern, said method including the steps of:

providing the night vision device with an optical pathway including a focal plane at which an image of the night scene is formed;

providing a transparent holographic reticle in said optical pathway and spaced from said focal plane; and using said holographic reticle to provide a holographic reticle pattern at said focal plane and superimposed on said night scene image thereat.

17. The method of claim 16 wherein said step of using said holographic reticle to provide said holographic reticle pattern includes the steps of illuminating said holographic reticle with excitation light, and using said excitation light to cause formation of said holographic reticle pattern at said focal plane.

18. The method of claim 17 wherein said method includes the steps of including a mirror in said optical pathway, forming an optical aperture in said mirror, and shining said excitation light through said optical aperture to illuminate said holographic reticle.

19. A night vision device comprising:

an objective lens for receiving low-level light from a night scene and providing an image of the night scene;

an image intensifier assembly receiving said low-level light and providing a visible image representative thereof;

an eye piece in which said image is visible;

said objective lens, image intensifier assembly, and said eye piece cooperatively defining an optical pathway; and a holographic reticle disposed in said optical pathway for providing a holographic reticle pattern superimposed on said image.

20. The night vision device of claim 19 wherein said holographic reticle includes a photosensitive holographic medium.

21. The night vision device of claim 20 wherein said holographic medium is chosen from the group of materials including dichromated gelatin, and silver halide.

22. The night vision device of claim 21 wherein said holographic reticle includes a glass plate supporting said holographic medium.

23. The night vision device of claim 22 wherein said holographic reticle includes a pair of glass plated sandwiching said holographic medium therebetween.

24. The night vision device of claim 19 further including a mirror reflecting said image to said eye piece and defining an optical aperture, and a light source selected to excite said holographic reticle and cause formation of said holographic reticle pattern, said light source being aligned with said optical aperture to illuminate said holographic reticle.

* * * * *